United States Patent [19]
Snowden et al.

[11] Patent Number: 5,974,032
[45] Date of Patent: Oct. 26, 1999

[54] METHOD AND APPARATUS FOR ADJUSTING DATA RATE IN A SYNCHRONOUS COMMUNICATION SYSTEM

[75] Inventors: Gregory O. Snowden, Boca Raton; Robert Mark Gorday, West Palm Beach, both of Fla.

[73] Assignee: Motorola, Inc., Schaumburg, Ill.

[21] Appl. No.: 08/861,308

[22] Filed: May 19, 1997

[51] Int. Cl.⁶ .................................................. H04B 7/185
[52] U.S. Cl. ............................................ 370/316; 455/12.1
[58] Field of Search ................................. 370/311, 465, 370/468, 315, 316, 321, 328, 329, 324, 341, 347; 340/825.44, 825.47, 825.49; 455/12.1, 13.2, 38, 427, 422, 426

[56] References Cited

U.S. PATENT DOCUMENTS

| | | |
|---|---|---|
| 5,051,993 | 9/1991 | DeLuca ................................ 340/825.44 |
| 5,128,665 | 7/1992 | DeLuca ................................ 340/825.47 |
| 5,168,493 | 12/1992 | Nelson et al. . |
| 5,257,019 | 10/1993 | Schwendeman .................... 340/825.49 |
| 5,546,411 | 8/1996 | Leitch et al. . |
| 5,603,079 | 2/1997 | Olds ........................................ 455/13.1 |
| 5,613,194 | 3/1997 | Olds et al. . |
| 5,659,539 | 8/1997 | Porter ........................................ 370/468 |
| 5,721,534 | 2/1998 | Olds .................................... 340/825.44 |

*Primary Examiner*—Ajit Patel
*Assistant Examiner*—Ricardo M. Pizarro
*Attorney, Agent, or Firm*—James A. Lamb

[57] ABSTRACT

A method and apparatus are for receiving a portion of a message by a call receiver (2). A radio signal is intercepted (910) which is modulated with a hierarchical signalling protocol having variable bit rate protocol divisions (443). A particular variable bit rate protocol division (443) includes the portion of the paging message and a bit rate indicator (460). An optimum bit rate that is being used in the particular variable bit rate protocol division is determined (930) from the bit rate indicator (460). Words (450, 455) in the particular variable bit rate protocol division (443) are decoded (940) using the optimum bit rate. The portion of the paging message is obtained (950) from the words.

5 Claims, 7 Drawing Sheets

METHOD AND APPARATUS FOR ADJUSTING DATA RATE IN A SYNCHRONOUS COMMUNICATION SYSTEM

RELATED APPLICATIONS

The following related applications are assigned to the same assignee as the present invention:

Application No. 08/769,363 filed Dec. 19,1996, entitled "INBOUND DATA RATE OPTIMIZATION IN A RADIO COMMUNICATION SYSTEM."

FIELD OF THE INVENTION

This invention relates in general to adjusting a data rate in a communication system, and in particular to adjusting a bit rate in a synchronous channel of a radio communication system.

BACKGROUND OF THE INVENTION

A known technique of increasing information throughput in synchronous signalling systems is to use increased bit rates to communicate the information. Older wide area radio communication systems, such as systems using the POCSAG (Post Office Commission Standards Advisory Group) signalling protocol, were designed to operate with pagers having a fixed bit rate. Newer systems, such as those using the FLEX™ family of signalling protocols licensed by Motorola, Inc., of Schaumburg, Ill., allow the use of a bit rate selected from a set of predetermined bit rates, typically by a set of portable or mobile receiving units operating in a common transmission cell.

The POCSAG and FLEX™ signalling protocols, like other signalling protocols, are defined using a hierarchical signalling protocol, with several protocol divisions of differing levels, wherein each protocol division is formed by a plurality of protocol divisions of a next lower level. The protocol divisions can be further identified as protocol divisions of the first, second, etc., level, with the first level protocol division being a POCSAG frame in POCSAG, comprising two POCSAG words and a FLEX™ block in FLEX™, comprising 8, 16, or 32 FLEX™ words, depending on the bit rate, so that FLEX™ blocks are of the same duration regardless of bit rate. The second level protocol division in POCSAG is a POCSAG batch, comprising eight POCSAG frames; the second level protocol division in FLEX™ is a FLEX™ frame, comprising 11 FLEX™ blocks. In POCSAG, no higher level protocol divisions are formally named; at this level, a single POCSAG transmission comprises any number of POCSAG batches, each preceded by a synchronization code. The third level protocol division in FLEX™ is a FLEX™ cycle, comprising 128 FLEX™ frames. The fourth level protocol division in FLEX™ is an hour, which comprises 15 FLEX™ cycles and has a duration of sixty minutes. Protocol division of higher levels in FLEX™ are defined by standard time divisions (day, month, and year).

As stated above, a bit rate used in the FLEX™ signalling protocol can be one of several predetermined bit rates. The bit rate being used for subsequent information being transmitted within a FLEX™ frame is identified at the beginning of each FLEX™ frame, during a synchronization pattern which is provided to allow any radios, such as pagers, that have been not receiving for a FLEX™ cycle or more to acquire exact word and bit synchronization. Pagers and other radios that are active in a FLEX™ system can be set up to go into a battery saving mode for all frames except one in a FLEX™ cycle, or can alternatively be set up to go into an active receiving mode for a plurality of frames, such as two or four in each cycle, effectively reducing an average latency for receiving messages, but at a trade-off of poorer battery life than when only one frame per cycle is used. Thus, the frame can alternatively be described as a battery saving protocol division in FLEX™.

Each time a radio goes into the active receiving mode, it acquires exact synchronization and determines the bit rate to be used within the FLEX™ frame. It further determines a protocol position within a frame at which information for the specific radio is located, for example, a frame number, a block number and a word number. The frame number could be the same frame at which the radio went into the active mode, or any other frame.

This design provides an efficient approach to operating a group of radios which receive message information within the same FLEX™ frame at a common bit rate which is maximized for the group. Generally, this works well when a common bit rate is used by a group of radios which always receive at one of the predetermined bit rates; the radios in the group can be assigned to a certain frame or frames that are predeterminedly sent using the bit rate. Thus, a maximum bit rate can be chosen for the group based on the capability of the system (for example, the density and power of fixed system transmitters) and the sensitivity of the receiving radios.

A third signalling protocol is described in U.S. Pat. No. 5,613,194 issued Mar. 18, 1997 to Olds et al., entitled "SATELLITE-BASED CELLULAR MESSAGING SYSTEM AND METHOD OF OPERATION THEREOF," in which the bit rate used for communicating information to pagers is fixed. Although this system is quite efficient, it does not provide for optimization of the bit rate as determined for a particular link to a particular receiving radio.

When all radios in a group of radios are of the same sensitivity and operate within a communication cell associated with a transmitter, it is well known to one of ordinary skill in the art that a specific link to one radio can be substantially better or worse than a link to another radio in the same group. Further improvements in throughput efficiency would be possible if a bit rate could be conveniently established for transmitting a portion of a message (up to and including a complete message) to each radio for which a portion of a message is queued depending on the characteristics of a specific link to the one radio.

Thus, what is needed is an improved technique within a radio communication system for establishing an optimum bit rate for transmitting a portion of a message to a radio which is compatible with a battery saving scheme, and a corresponding technique in a radio for responding to the optimum bit rate.

DETAILED DESCRIPTION OF THE DRAWINGS

The unique signalling protocol, method, and apparatus described herein with reference to a preferred embodiment of the present invention are based on a satellite communication system which is described in U.S. patent application Ser. No. 08/317,083 filed Oct. 3, 1994, entitled "Satellite-based Cellular Messaging System and Method of Operation thereof," assigned to the assignee of the present invention, and which is hereby incorporated by reference.

Figure 1:
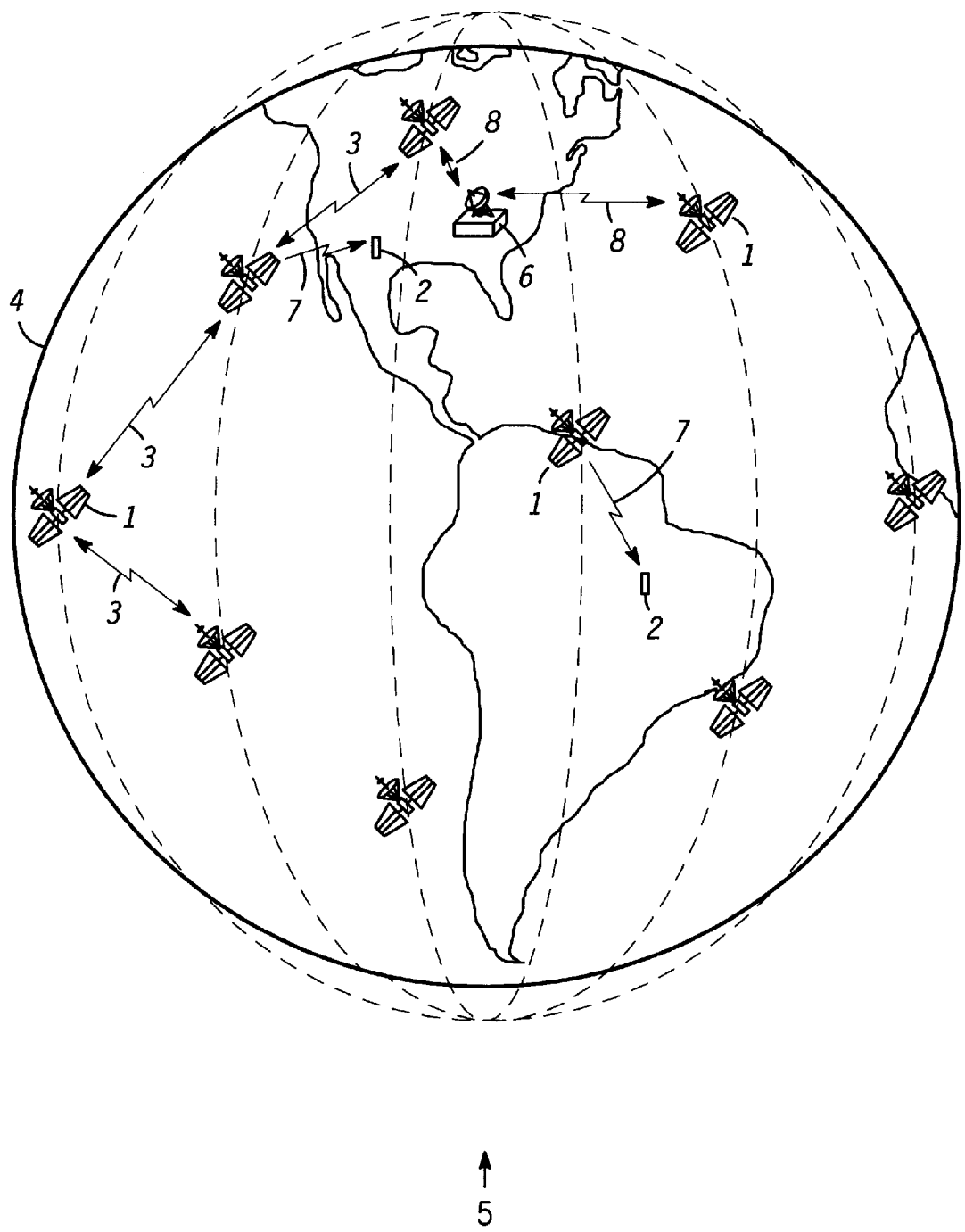
FIG. 1 shows an overview diagram of a satellite cellular communications system, in accordance with the preferred embodiment of the present invention.

Referring to FIG. 1, an overview diagram of a satellite cellular communications system (SCCS) is shown, in accordance with the preferred embodiment of the present invention. Several satellites 1 are placed in a relatively low orbit around the earth 4. As illustrated in FIG. 1, satellites 1 are preferably placed in orbits so that the entire constellation of satellites 1 provides continual coverage for the entirety of earth 4.

In addition to the satellites 1, SCCS 5 additionally includes one or more central switching offices (also referred to as "gateways") 6. Gateways 6 reside on the surface of earth 4 and are in data communication with nearby ones of satellites 1 through RF communication links 8. Through the constellation of satellites 1, a gateway 6 can control communications delivered to any size region of the earth 4. Gateways 6 couple to public switched telecommunication networks (not shown), through which requests for the placement of calls to subscribers of SCCS 5 can be received. FIG. 1 shows only one gateway 6 for convenience. However, those skilled in the art will appreciate that any number of gateways 6 can be employed in association with any number of regions of the earth 4. Each of such gateways 6 operates substantially as described herein.

System 5 also includes any number, potentially in the millions, of call receivers 2. Call receivers 2 can be configured as conventional pagers or can be included within other portable equipment. Although call receivers 2 are referred to hereinafter as pagers 2 for simplicity, those skilled in the art will appreciate that call receivers 2 within SCCS 5 need not be included only in units dedicated to traditional paging functions. Pagers 2 are configured to receive communications from overhead satellites 1 and to perform other functions which are discussed below.

Communications from satellites 1 are received at pagers 2 over communication links 7. In a preferred embodiment of the present invention, links 7 utilize RF frequencies which accommodate substantially line-of-sight communication, and links 7 are simplex links. In other words, communications travel only in one direction from satellites 1 to pagers 2. Simplex communication allows pagers 2 to be manufactured as small, inexpensive units and to consume a minimal amount of power. No simplex communication limitation is implied with respect to links 3 or 8.

Figure 2:
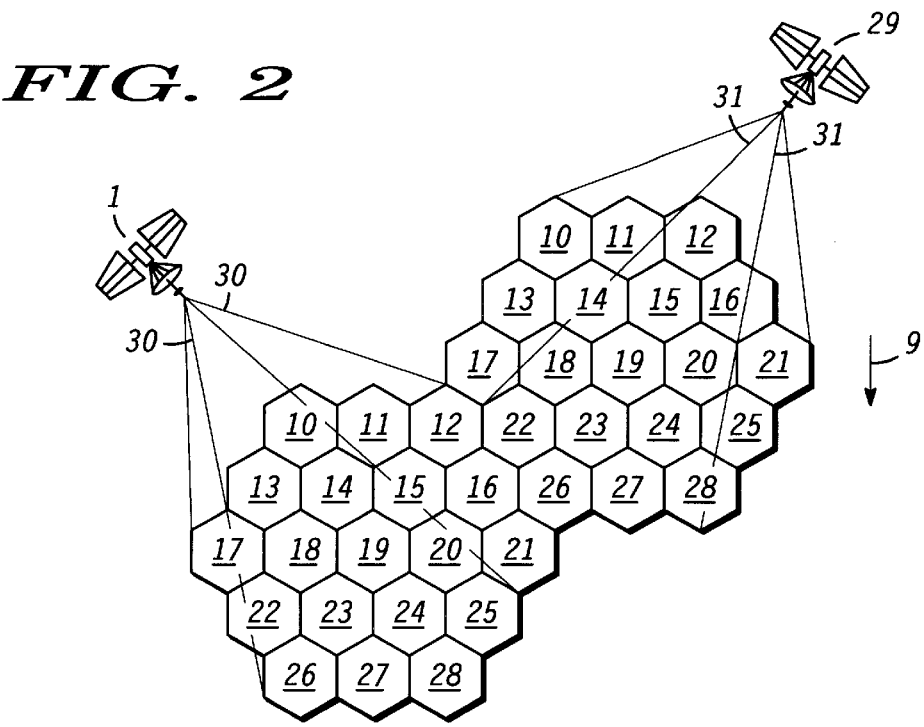
FIG. 2 shows a diagram of cellular patterns formed by adjacent satellites projecting communication beams upon the surface of the earth, in accordance with the preferred embodiment of the present invention.

Referring to FIG. 2, a diagram of cellular patterns formed by adjacent satellites projecting communication beams upon the surface of the earth is shown, in accordance with the preferred embodiment of the present invention.

Satellites 1 and 29 (which can be identical to satellite 1) employ frequency spectrum reuse techniques. These techniques comprise cellular partitioning of projection beamwidths. Satellites 1 and 29 generate beam set projections 30 and 31, respectively. Beam set projections 30 and 31 are bi-directional gain areas (cells) associated with antennas on satellites 1 and 29. These antennas can be individual directional antennas or a phased-array antenna capable of coherent beam projection.

Cells 10–28 may assume many shapes depending on the gain characteristics of the antennas. In FIG. 2, cells 10–28 are shown as hexagons for illustrative purposes. Cells 10–28 advance in orbit direction 9 as satellites 1 and 29 orbit in direction 9.

With satellites 1 and 29 traveling at speeds of up to 25,000 km/hr with respect to the earth, cells 10–28 also travel over the earth at close to this speed. At this speed, any given point on the surface of the earth resides within a single cell for no more than around one minute.

Referring again to FIG. 1, satellites 1 communicate with pagers 2 over links 7 using numerous frequency sub-bands. Thus, satellites 1 and pagers 2 desirably employ a frequency division multiple access (FDMA) scheme so that numerous independent communication links can be established simultaneously. The entire spectrum of these numerous frequency subbands is available within each cell. For example, a seven-cell frequency reuse pattern, depicted in FIG. 2, is implemented using time division multiple access (TDMA) techniques to prevent interference between adjacent cells.

In other words, while the entire spectrum is available in each cell, adjacent cells are assigned different time slots within which that spectrum may be used. In a preferred embodiment, frames are defined to include at least seven different time slots to correspond to the seven-cell reuse pattern. Cells labeled "10" in FIG. 2 are assigned one time slot, cells labeled "11" are assigned another time slot, and so on. That way, cells which utilize the same spectrum at the same time are geographically spaced apart from one another.

While FIG. 2 illustrates a seven-cell, seven time slot arrangement, those skilled in the art will understand that a larger or smaller reuse pattern can also be used. Those skilled in the art will appreciate that such a TDMA communication scheme is established at satellites 1. Moreover, when satellites 1 move at speeds of up to 25,000 km/hr, Doppler shift and time slot synchronization parameters between a pager 2 and a satellite 1 constantly change.

In a preferred embodiment of the present invention, satellites 1 are configured as moving repeaters. In other words, satellites 1 do little more than receive data communication messages from one source and pass these messages on to a destination. Nothing requires all of communication links 3, 8, and 7 to be similar in frequency and/or timing protocol parameters.

Thus, satellites 1 can also re-package messages received from one communication link into a format compatible with another link before passing the messages on. In addition, satellites 1 can include components which help resolve Doppler and timing shift parameters in connection with the operation of links 3, 8, and 7. Satellites 1 can advantageously communicate such parameters to the entities with which they communicate, such as pagers 2, central switching office 6, and other satellites 1, to help in maintaining synchronization with links 3, 8, and 7.

Figure 3:
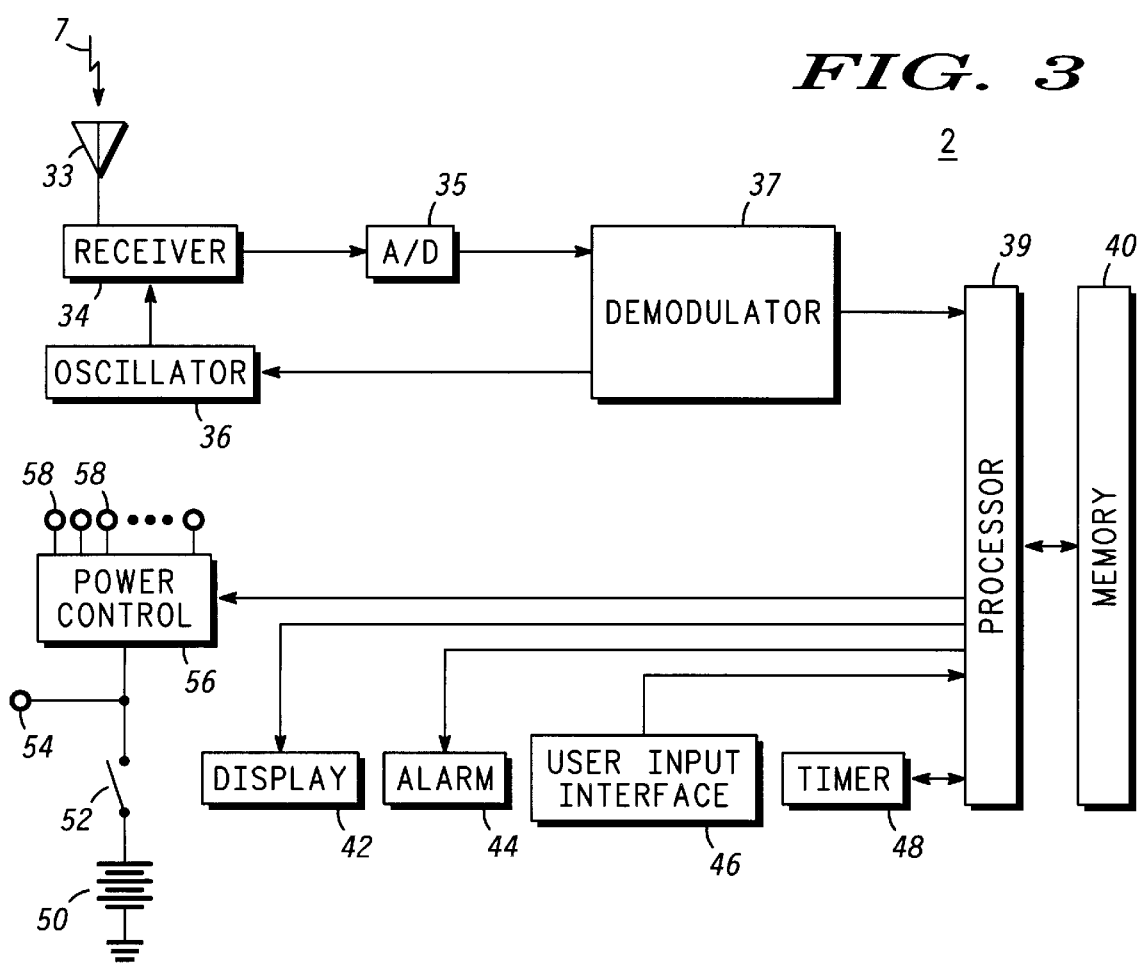
FIG. 3 shows an electrical block diagram of a pager constructed in accordance with the preferred embodiment of the present invention.

Referring to FIG. 3, an electrical block diagram of a pager 2 is shown, in accordance with the preferred embodiment of the present invention. Pager 2 includes an antenna 33 through which communication link 7 is established. Antenna 33 feeds a receiver section 34, which includes radio-frequency (RF), mixing, and intermediatefrequency (IF) stages (not shown) as needed to convert RF signals broadcast by satellites 1 to baseband. Receiver section 34 couples to an analog-to-digital (A/D) converter 35, which digitizes the baseband signal, and A/D converter 35 couples to a digital demodulator 37 that extracts digital data from the digitized baseband signal.

In accordance with the preferred embodiment, demodulator 37 recovers either bi-phase shift keying (BPSK) encoded data or quaternary phase shift keyed (QPSK) encoded data included in the transmission from link 7. Both the BPSK and QPSK are modulated at 25,000 symbols per second, providing bi t rates of 25,000 bits per second (BPS) and 50,000 bps, respectively. The bit rate at which demodulation is performed is determined by an optimum bit rate indicator 460 (FIG. 6) included in a received signal, as described more fully herein, below. Demodulator 37 also supplies a feedback signal to control an oscillator 36 to control the frequency channel. Oscillator 36 provides an oscillation signal that receiver section 34 uses in converting the RF signal to baseband.

Demodulator 37 is preferably a digital signal processor which is programmed to provide frequency shift correction and certain decoding functions, such as deinterleaving, error correction and detection, and address detection. The program instructions are included in a memory preferably included in the digital signal processor, although it will be appreciated that the program instructions could be included in an external memory similar to memory 40, coupled to the digital signal processor. Demodulator 37 is adapted by a unique set of program instructions to provide the unique optimum bit rate decoding function which is described herein, below. Demodulator 37 feeds its digital data output to a processor 39.

Processor 39 couples to a memory 40. Memory 40 includes permanently stored data which does not change as a result of operating pager 2. Such permanent data includes computer programs that instruct pager 2 to perform various procedures, which are discussed below. Such permanent data also includes permanent variables which are used in the operation of pager 2, as discussed below. Memory 40 also includes temporary data, which changes as a result of operating pager 2. It is processor 39, under the control of programs stored in memory 40, that controls the user interface and message management operations of pager 2.

Processor 39 couples to various peripheral devices, such as a display 42, an alarm 44, a user input interface 46, and a timer 48. Processor 39 controls display 42 to visibly present data to a user of pager 2. Processor 39 controls alarm 44 to audibly and/or visibly indicate the receipt of a call addressed to pager 2. Processor 39 receives user input, preferably through the operation of keys or buttons (not shown) through interface 46. Processor 39 utilizes timer 48 to synchronize its operations with system timing and, in one embodiment, to keep track of the time of day. Those skilled in the art will appreciate that the function of timer 48 can alternatively be performed within processor 39 and demodulator 37.

Pager 2 is energized by a battery 50. Battery 50 couples through a power switch 52 to a terminal 54 and to a power control section 56. Power control section 56 switches power to terminals 58 in accordance with commands received from processor 39. Terminal 54 supplies power to at least timer 48. Terminals 58 supply power to the remaining components of pager 2. Pager 2 is de-energized when switch 52 is open, and pager 2 is fully energized and operational when switch 52 is closed and when power is routed to all of terminals 58. Pager 2 can also operate in a energized but low power sleep mode. Pager 2 operates in its sleep mode when power is not routed to one or more of terminals 58, but switch 52 is closed to route power through terminal 54 to at least timer 48.

Those skilled in the art will appreciate that nothing prevents processor 39 from being de-energized in the sleep mode of operation. However, in this situation, timer 48 can advantageously control the application of power to processor 39, rather than processor 39 controlling power to itself as shown in FIG. 3. Moreover, those skilled in the art will appreciate that power can be continuously applied to at least a portion of memory 40 during the sleep mode to prevent the destruction of temporary data. In accordance with alternative embodiments of the present invention, the switch 52 is not provided and/or output signals from the processor 39 directly control one or more or all of the remaining components of the pager 2 by means of a power control input of each of the other components, and the power control 56 provides only regulation of the power or is non-existent.

Figure 4:
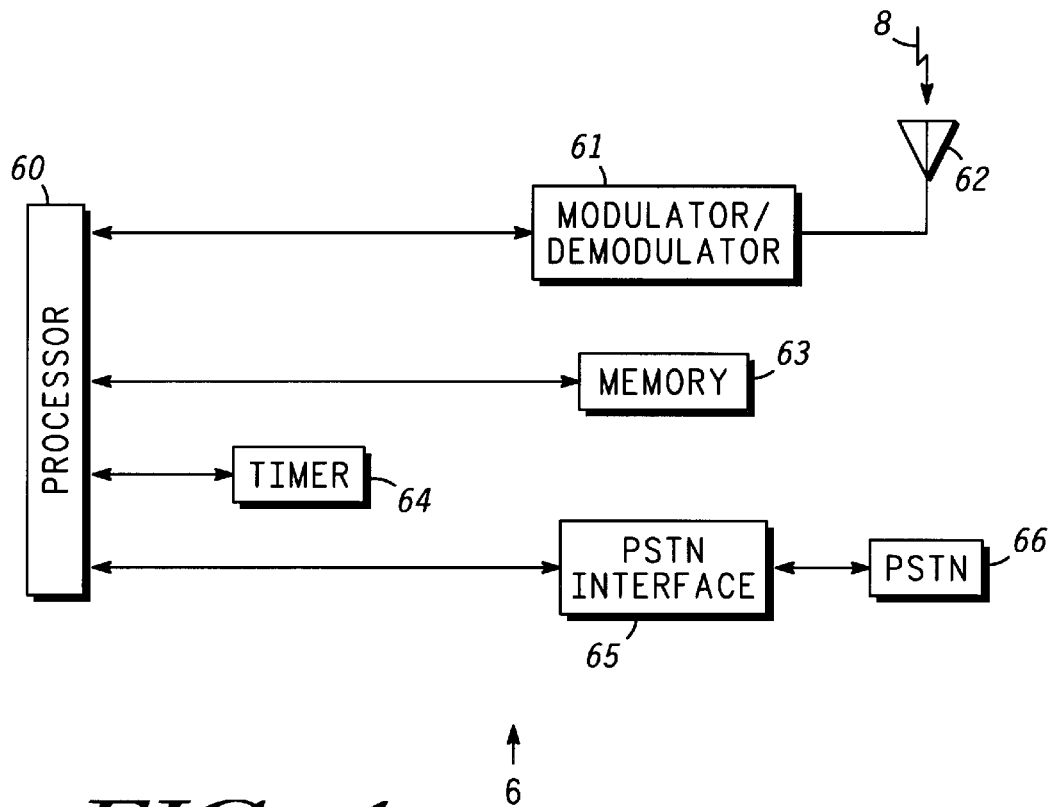
FIG. 4 shows an electrical block diagram of a central switching office or "gateway", in accordance with the preferred embodiment of the present invention.

Referring to FIG. 4, an electrical block diagram of a central switching office or gateway 6 is shown, in accordance with the preferred embodiment of the present invention. Gateway 6 includes a processor 60, which can be implemented by a single processor or by a network of processors. Processor 60 couples through a modulation/demodulation section 61 to an antenna 62. Antenna 62 is used in establishing communication link 8. Modulation/demodulation section 61 converts digital data produced (or used) by processor 60 into (or from) modulated RF communications compatible with link 8.

Gateway 6 also includes a memory 63 which stores permanent and temporary data. Such permanent and temporary data include computer programs, data which do not change through operation of gateway 6, and data which change through the operation of gateway 6. A timer 64 also couples to processor 60. Timer 64 allows gateway 6 to keep a current system time and to act, so that transmissions are sent from gateway 6 in accordance with real-time demands, which are discussed below. Through a public switched telecommunications network (PSTN) interface 65, processor 60 couples to PSTN 66. Requests to place calls to pagers 2 can be received through PSTN 66 and interface 65. In addition, requests to place calls to pagers 2 can be received through the network of satellites 1 (see FIG. 1) and link 8.

Figure 5:
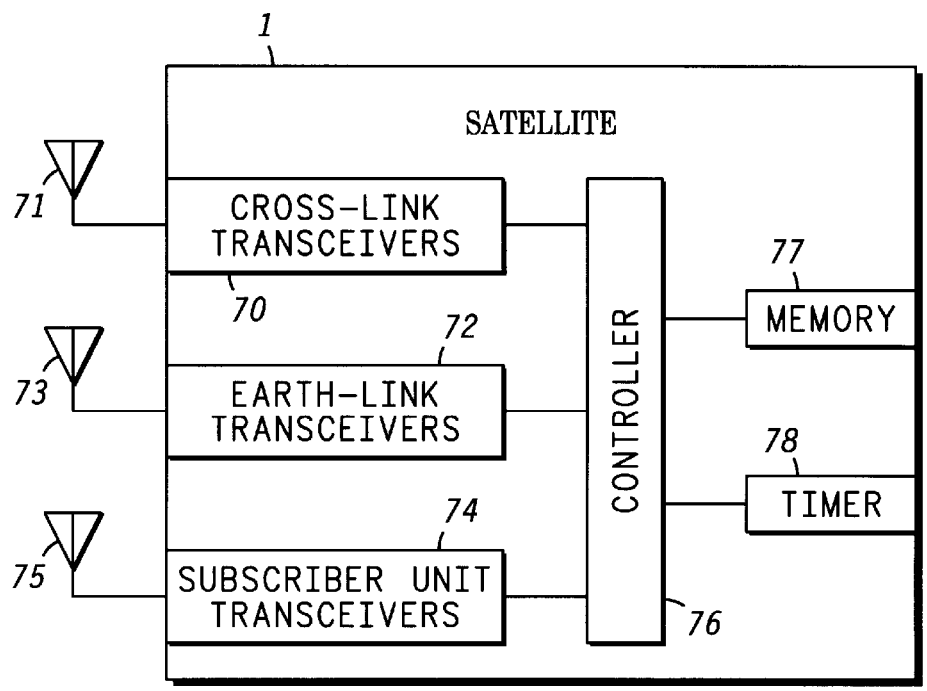
FIG. 5 shows a block diagram of a satellite of the satellite cellular communications system of FIG. 1, in accordance with the preferred embodiment of the present invention.

Referring to FIG. 5, an electrical block diagram of a satellite of the SCCS 5 of the present invention is shown, in accordance with the preferred embodiment of the present invention. Preferably, all satellites 1 within SCCS 5 (see FIG. 1) are substantially described by the block diagram of FIG. 5. Satellite 1 includes cross-link transceivers 70 and cross-link antennas 71. Transceivers 70 and antennas 71 support crosslinks 3 (FIG. 1) to other nearby satellites 1.

Earth link transceivers 72 and earth-link antennas 73 support gateway links 8 (FIG. 1) to communicate with gateways 6.

Moreover, subscriber unit transceivers 74 and subscriber unit link antennas 75 support pagers 2 (FIG. 1). Preferably, each satellite 1 can simultaneously support links for a large number of pagers 2 (FIG. 1). Of course, those skilled in the art will appreciate that antennas 71, 73, and 75 can be implemented either as single multi-directional antennas or as banks of discrete antennas. It is desirable that subscriber unit antenna 75 be a phased-array antenna capable of accessing many cells 10–28 (FIG. 2) simultaneously. In a preferred embodiment, up to forty-eight individual spot beams access an equal number of cells simultaneously.

A controller 76 couples to each of transceivers 70, 72, and 74 as well as to a memory 77 and a timer 78. Controller 76 can be implemented using one or more processors. Controller 76 uses timer 78 to maintain the current date and time. Memory 77 stores data that serve as instructions to controller 76 and that, when executed by controller 76, cause satellite 1 to carry out procedures which are discussed below. In addition, memory 77 includes variables, tables, and databases that are manipulated due to the operation of satellite 1.

Subscriber unit transceivers 74 are desirably multi-channel FDMA/TDMA transceivers capable of transmitting and receiving on all different selectable frequency sub-bands during particular, selectable, time slots as directed by controller 76. Subscriber unit transceivers 74 have a sufficient number of frequency sub-bands to provide the desired number of transmission and reception frequencies for communications. Controller 76 can provide for allocation of the frequency and time-slot assignments, generation of ring alert messages and information contained therein. Subscriber unit transceivers 74 desirably provide for transmission and reception on any frequency sub-band set, so that each subscriber unit transceiver 74 can, if needed, utilize the entire spectral capacity of all frequency sub-bands.

The subscriber unit transceivers transmit the paging carriers at higher power than the general traffic, duplex carriers. This additional power provides improved link margin over the general traffic subbands. This additional link margin enhances the ability of the paging carriers to penetrate obstacles such as vehicles and buildings. It also permits less sensitive, and thus less expensive, pagers 2 to be used with the system.

Overview of Paging System

The SCCS 5 of the present invention is capable of delivering paging messages anywhere in the world. At the user's discretion, a single paging message can be sent to a geographic region varying in size from a small local area to total planetary coverage.

Each pager 2 is assigned an operating interval in the timing and frequency hierarchy. The SCCS 5 paging infrastructure assures that pages are delivered when the destination pager 2 is active.

L-Band Subsystem

The L-Band is the portion of the radio frequency spectrum which is used for the satellite link 7 with the subscriber unit. The L-Band subsystem provides two basic types of subscriber channels. Duplex channels support two-way communications services, and simplex channels support one-way messaging services. A channel is a combination of a signalling protocol time division (or just a "protocol division") and a frequency sub-band. Duplex services include portable and mobile telephone service, a variety of bearer data services, duplex messaging services, service to mobile exchange units (MXU's) and service to Multi-Line Units (MLU's). Simplex services support the directed messaging service for paging messages.

In addition to the bearer service channels, the L-Band subsystem provides channels that support SCCS 5 overhead functions. These functions include acquisition and access control, subscriber ring alert, subscriber geolocation, and subscriber handoff between antenna spot beams and satellites.

Paging Time and Frequency Control

System access for paging subscribers is limited by the battery life that can be practically obtained in paging units. Pagers are required to operate for a reasonable period of time on inexpensive, easily available batteries if paging is to be commercially viable. This places severe constraints on the activity of the pagers. The SCCS 5 uses a hierarchical time and frequency strategy to minimize internal pager activity while maintaining adequate paging availability.

The paging communications architecture primarily uses time division multiplexing (TDM) with limited frequency division multiplexing (FDM). These time and frequency resources are organized into an operational hierarchy that determines which time and frequency resources are available at any time. The frequency sub-bands are alternatively called frequency accesses.

Each pager 2 is assigned a position in the time and frequency hierarchy when it is built, or when it is re-programmed. This position determines when the pager 2 is active and what frequency access it monitors. The network paging infrastructure is responsible for tracking the individual pager 2 assignments and insuring that the pages are delivered at an appropriate time on a correct frequency access.

Each 90 ms L-Band frame (described with reference to FIG. 6) includes a simplex time slot (described with reference to FIG. 6). A satellite transmits paging information bursts on up to two frequency accesses during this simplex time slot during normal (baseline) operation. Two additional paging information bursts on two additional frequency accesses can be transmitted if some duplex channel capacity is sacrificed. Each different burst is transmitted in a different main mission antenna beam, so the bursts cover different geographical areas. The four frequency access frequencies are selected from the frequency accesses reserved for paging in a simplex channel frequency band that is licensed for global operation. The frequency accesses and beams used at any time are coordinated among all of the system's satellites to avoid interference.

As will be explained in greater detail below, the frequency accesses used for paging are assigned a permanent priority and activated by the system control segment according to the paging traffic demand. Frequency accesses are activated in priority order, i.e., the primary paging frequency access is always active. If more paging capacity is required, the secondary frequency access is activated. This continues with the tertiary and quaternary frequency accesses.

Paging Protocol Hierarchy

Figure 6:
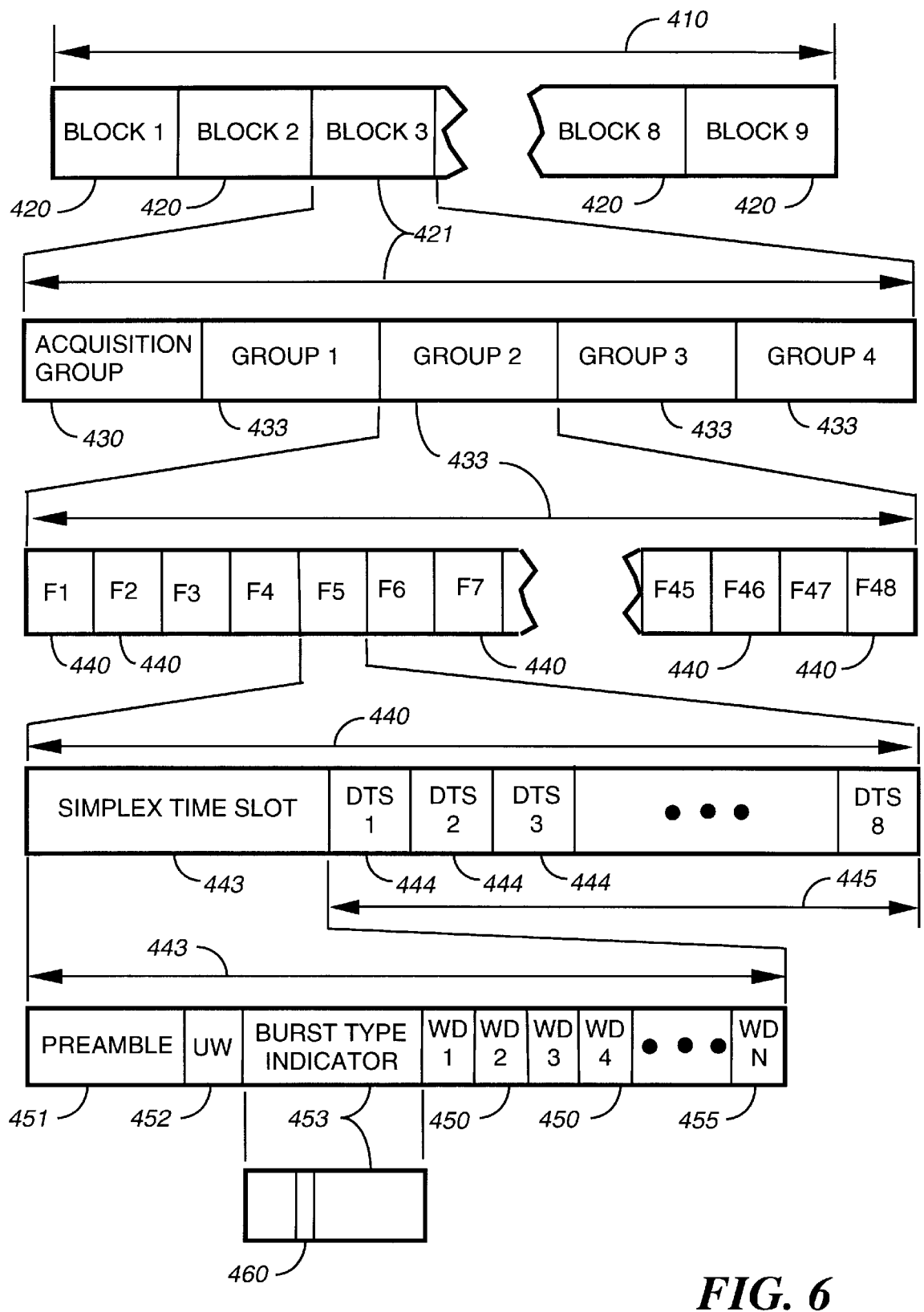
FIG. 6 shows a timing diagram which illustrates features of the transmission format of a hierarchical signalling protocol utilized within the satellite cellular communications system of FIG. 1, in accordance with the preferred embodiment of the present invention.

Referring to FIG. 6, a timing diagram which illustrates features of the transmission format of a hierarchical signalling protocol utilized within the SCCS 5 of FIG. 1 is shown, in accordance with the preferred embodiment of the present invention. A downlink radio signal is modulated with the downlink signalling protocol, which is subdivided into protocol divisions, which include a superframe 410, a block 420, 421, a group 430, 433, a frame 440, simplex and duplex time slots 443, 444, and a word 450, 455. The superframe 410 comprises nine blocks 420, 421 that are identified as block 1 through block 9, and that are transmitted sequentially. The superframe 410 has a duration of 194.4 seconds. Each block 420, 421, which has a duration of 21.6 seconds, comprises five groups 430, 433, identified as an acquisition group 430 and four message groups 433 that are identified as group 1 through group 4. Each group 430, 433, which has a duration of 4.32 seconds, comprises 48 sequentially transmitted frames 440 that are identified as frame 1, frame 2, etc., up to frame 48. Each frame 440, which has a duration of 90 milliseconds (msec), comprises the simplex time slot 443 having a duration of 20.32 msec and a plurality of the duplex time slots 444 (DTS 1, DTS 2, . . . DTS 8). The plurality of duplex time slots 444 form a duplex portion 445 of the frame 440, which has a duration of 69.68 msec. The simplex time slot 443 and duplex time slots 444 are transmitted sequentially.

A paging information burst 443 which fills the simplex time slot 443 comprises a preamble 451, a unique word (UW) 452, a burst type indicator 453, and a plurality of words 450, 455. The preamble 451 comprises 64 bits of a predetermined pattern chosen to correct frequency offset in a conventional manner, which in accordance with the preferred embodiment of the present invention is an unmodulated frequency carrier, which is decodable as a repeating 0, 0, 0, 0 . . . pattern. The unique word 452 comprises 12 bits which are chosen to optimize an identification of an end of the preamble. The burst type indicator 453 comprises 16 bits which indicate several characteristics of the words 450, 455 which follow. The burst type indicator 453 includes an optimum bit rate indicator 460, comprising at least of one bit of the 16 bits, which indicates which of two bit rates is used in the remainder of the simplex time slot 443. The ninety two bits included in the preamble 451, the unique word 452, and the burst type indicator 453 are always sent using BPSK modulation at a symbol rate of 25,000 symbols per second (sps), or 25,000 bits per second (bps). Depending on the bit rate determined for use in the words 450, 455, there are either thirteen or twenty six 32 bit words 450, 455 in the remainder of the simplex time slot 443. The words are identified as word 1 (WD 1), word 2 (WD 2), up through word N (WD N), wherein N is either 13 or 26, depending on the bit rate. Each word is formed from a set of 21 information bits which are operated on by a redundancy function that increases the number of bits in each word to 32 and provides error protection, in a manner well known to one of ordinary skill in the art. The words 450, 455 are further interleaved with each other in groups of two and three consecutive words, in a conventional manner, for improved performance in a burst error environment such as that caused by signal fading. A different predetermined pattern of such word interleaving is uniquely associated with each bit rate. When a bit rate of 50,000 bps is used, the words are preferably interleaved using 13 sequential pairs of the 26 words. When a bit rate of 25,000 bps is used, the words are preferably interleaved using a sequential triplet of words plus 5 sequential pairs of words. These two methods of interleaving are defined herein as interleaving modes. Other predetermined interleaving modes could be used in other embodiments. The bit rate indicator 460 uniquely indicates the interleaving mode as well as the bit rate. When a bit rate of 25,000 bps is indicated by the optimum bit rate indicator 460, BPSK having a symbol rate of 25,000 sps is used, and when a bit rate of 50,000 bps is indicated in the bit rate indicator 460, QPSK having a symbol rate of 25,000 sps is used to modulate and demodulate the simplex time slots 443. Further included within the simplex time slot 443 at a predetermined position within the protocol are a frame ID, a group ID, and a block ID (not shown in FIG. 6), which identify the frame, group, and block number within which the simplex time slot 443 is transmitted. In accordance with the preferred embodiment of the present invention, the optimum bit rate indicator 460 is at the protocol division level which is the simplex time slot 443. This protocol division can also be described for the signaling protocol of the present invention, as well as for other signaling protocols, as a variable bit rate protocol division, that is, the protocol division at which the optimum bit rate operates.

It will be appreciated that the frame 440 could, in alternative embodiments, comprise more than one simplex time slot 443, that the words 450 could be error protected in another manner, such as a convolutional code which operates on all the information bits of all the words 450, 455 in common, and that the words 450, 455 could each comprise a number of information bits other than 21. The information being encoded for error protection within the simplex time slot 443 does not have to be defined as words. It could, for instance, be a set of information which is a portion of digitally encoded compressed voice. An important characteristic of the simplex time slot 443 when the information bits are either interleaved on a word basis or convolved is that the set of information bits within the simplex time slot 443 is dispersed within the simplex time slot 443 by the interleaving. By this it is meant that the information bits are no longer in consecutive order. It will be appreciated that implementation of a changeable bit rate is undesirable within one set of dispersed information, so that the lowest protocol division at which an optimum bit rate can be used practically is a single set of dispersed information. The undesirability arises from not having well defined boundaries within one set of dispersed information at which to place bit rate indicators 460. In an alternative embodiment in which convolutional encoding of all the information bits of all the words 450, 455 in the simplex time slot 443 is performed, the dispersion is over the entire set of information bits and results in a set of dispersed information within which information bits are no longer identifiable. The lowest protocol division in such a case is constrained by the dispersion to the frame 440, due to the undesirability described above.

Each pager 2 is active during an active block which is a predetermined one of the blocks 420, 421 associated with each pager 2. Block 3 is the active block 421 in the example shown in FIG. 6. Portions of paging messages up to and including complete paging messages, depending on the length of a paging message, can be sent to an active pager 2 during any frame 440 of any group 430, 433 within its active block 421. Portions of paging messages are sent to one or more beams of the subscriber unit transceiver antenna 75 (FIG. 5) during one or more active frequency accesses. The first group 430, 433 of every block 420, 421 is the acquisition group 430 for that block 420, 421. The acquisition group 430 includes an activity table that indicates in which frames 440 in the message groups 433 of the block 420, 421 portions of paging messages will be sent to the area covered by the acquisition group 430 on any given frequency. This allows pagers 2 to return to sleep mode during times that they will not receive paging traffic during their assigned block 421, in order to save battery power. The message groups 433 do not include the activity table and provide most of the paging message capacity of the block 420. The block protocol division is alternatively described herein as the battery saving protocol division, because the pager 2 is on only during portions of the assigned one of the nine identified blocks 421 associated with the pager 2.

Frequency Accesses

The paging subsystem can use up to four frequency accesses. The primary paging frequency access is always active during the acquisition group 430 of each block 420, 421. Other paging frequency accesses are activated in the message groups 433 under system control in areas where the paging traffic cannot be delivered by the primary frequency access alone. Frequencies are activated in a hierarchical sequence. The acquisition group 430 of each block 420, 421 includes information that indicates to each pager 2 which one or ones of up to four predetermined paging frequency accesses are active during that block 420, 421, and for each active paging frequency access, which of the 48 frames within the block 420, 421 include portions of paging messages and which do not.

Paging Delivery Operation

The operation of the SCCS 5 with regard to the delivery of paging messages will now be described.

Channel Scheduling and Channel Use Restrictions

The SCCS 5 controls the channel scheduling for all of the satellites 1. There are a number of channel use restrictions that the SCCS 5 uses in performing this scheduling operation.

Paging is accomplished during the simplex time slot 443 at the beginning of each 90 ms frame 440. In a preferred embodiment, one paging information burst 443 can be transmitted into one subscriber unit transceiver antenna (FIG. 5, 75) beam on each active paging frequency access. Only one paging information burst 443 is transmitted into any particular beam in a given frame 440, and no more than two paging frequency accesses are simultaneously active on one subscriber unit transceiver antenna.

Selection of the beams and frequencies used in a given frame 440 is also restricted to avoid interference with other paging channels and a ring alert channel. This interference is avoided by spatial isolation. That is, simultaneous paging information bursts 443 are transmitted in antenna beams that have adequate pattern isolation to insure that they do not interfere with one another.

An important consideration in controlling this interference is the differential Doppler between satellites. The Doppler shift in certain beams can be as high as ±37.5 kHz, so it is possible for the frequency access signals (up to four) which can be used during one frame 440 to interfere with each other due to Doppler shift. Frequency access allocations are established during system design such that these signals are isolated when these Doppler shifts occur.

Message Delivery Scheduling

The delivery of paging messages is coordinated with the sleep/wake cycle of the pager 2 for which a paging message is intended. During each 194.4 second superframe 410, a pager 2 is active for receiving paging messages during the 21.6 second predetermined active block 421 associated with the pager 2. In addition each pager 2 comprises a frequency access assignment table that determines which frequency access is used by that pager 2 for any combination of active paging frequency accesses that might be used by the SCCS 5.

Paging messages can be transmitted multiple times to improve the delivery reliability. These deliveries are scheduled to insure that the pages into a given geographic area are transmitted from satellite positions with large angular offsets. This angular diversity increases the probability that the shadowing and blockage of various geometric structures (e.g., buildings, mountains, etc.) are uncorrelated between the two delivery attempts. The angular diversity is preferably accomplished by transmitting from satellites in two different orbital planes, but it is occasionally necessary to use positions in the same orbital plane but with large angular offsets.

Also, as described above, a portion of a paging message within a simplex time slot 443 of a frame 440 can be transmitted at one of two bit rates (25,000 or 50,000 bits per second), in order to improve the delivery reliability Message Delivery Orders The satellite receives paging delivery orders from the gateway 6 using a Message Delivery Order (MDO), which includes a Delivery Frame identifier, a Delivery Beam identifier, a Frequency Access identifier, an Optimum Bit Rate Identifier, and a portion of a paging message, or one or more paging messages. Each delivery order includes message data intended for one frame 440.

The satellite receives an MDO and determines the delivery parameter identifiers. It assembles and buffers the frame information until an appropriate time for the identified frame 440. At that time, the satellite adds the preamble 451(FIG. 6) and unique word 452 (FIG. 6) and transmits the simplex time slot 443 within a paging burst at the optimum bit rate, including the optimum bit rate indicator 460 within the burst type indicator 453.

Information Flow

Figure 7:
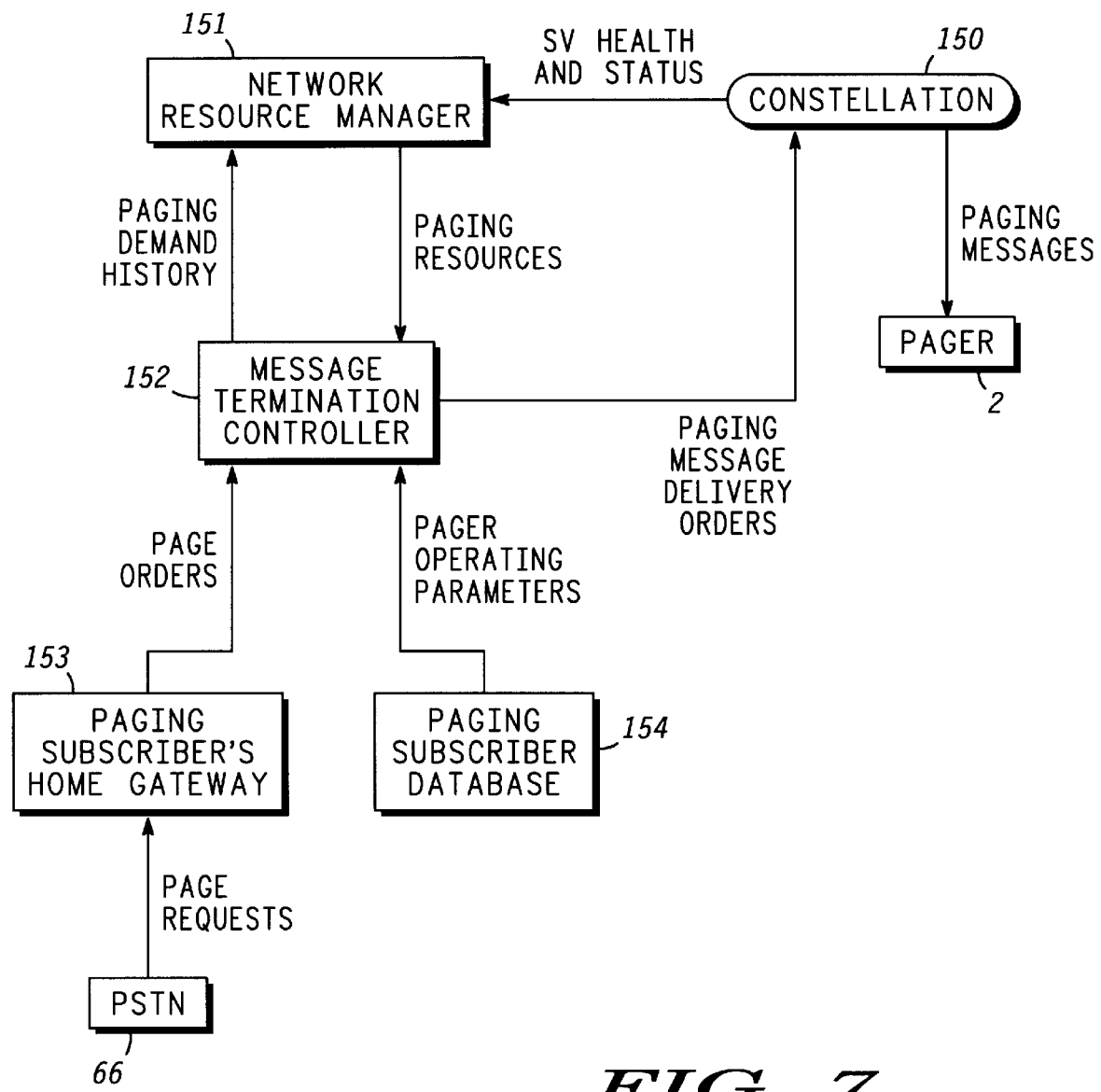
FIG. 7 shows an information flow of the satellite cellular communications system of FIG. 1, in accordance with the preferred embodiment of the present invention.

Referring to FIG. 7, an information flow of the SCCS 5 is shown, in accordance with the preferred embodiment of the present invention. For the purposes of the following discussion, FIG. 7 includes a constellation 150 of satellites, a network resource manager 151, a message termination controller 152, a paging subscriber's home gateway 153, a paging subscriber database 154, and a PSTN (public switched telecommunications network) 66.

The network resource manager 151 resides in a dedicated system control segment (SCS) (not shown) whose function includes tracking, telemetry, and control of the constellation's satellites. The message termination controller (MTC) 152 and paging subscriber database 154 reside in a gateway 6.

To insure that a portion of a paging message is delivered at the proper time and frequency, the SCCS 5 maintains the paging subscriber database 154, which includes the active block 421 and the frequency access assignment table for each pager 2. The MTC 152 uses that information to organize sequences of paging messages into delivery orders that are sent to each satellite 1. These delivery orders include one frame of paging data along with the Delivery Frame, Delivery Beam, Frequency Access, and Optimum Bit Rate Identifier. The optimum bit rate used for each frame 440 is determined by an estimate of a link gain for the downlink from the satellite 1 to the pager 2 and other attributes, such as a length of the paging message. The link gain is based on the calculated position of the satellite 1, the determined delivery beam, and the determined frequency access included in the MDO.

Message delivery schedules consider the available satellite resources and other channel restrictions, along with pager operation. This information is generated by the Network Resource Manager 151 in the System Control Segment (SCS). The SCS uses paging demand projections, projections of other service demand, information about the operational status and energy state of each satellite, and interference planning rules to determine which beams can be paged on which frequency accesses in each frame.

These resource allocations are sent to the MTC as a set of constraints which cannot be violated when the page deliveries are scheduled. The MTC aids in projecting future paging traffic by reporting the paging demand history to the SCS. This paging message flow is illustrated in FIG. 7.

The satellite receives the paging Message Delivery Orders and assembles them in a paging data buffer according to the scheduled Delivery Frame, Delivery Beam, Frequency Access, and Optimum Bit Rate Identifier. At the scheduled frame, the data is read from the buffer, modulated onto the indicated frequency access and transmitted into the specified Delivery Beam. The MTC insures that no more than one paging information burst 443 is scheduled for each active Frequency Access or Delivery Beam during any frame.

Message Delivery Orders are transmitted so that they arrive during a group 430, 433 before the group 430, 433 in which they are scheduled to be transmitted. Thus, the satellite includes large enough buffers to store two groups of paging data along with the scheduling information.

Paging Channel Operation

The operation of the paging channel of SCCS 5 will now be described.

The first forty-eight frames of each block 420, 421 comprise the acquisition group 430, during which one paging information burst 443 is transmitted to every active antenna beam (i.e., forty-eight beams) on an satellite by every active frequency access. A different beam is visited during each frame 440 by each active frequency access. Every active paging frequency access sends an acquisition group 430 during these frames 440.

Each frequency access visits a beam once and only once during an acquisition group. Thus, if there are less than forty-eight beams active on an satellite, some frames have no transmissions or do not transmit on every frequency access. This strategy permits the SCCS 5 to have simultaneous acquisition groups on all satellites 1.

In a preferred embodiment, only the primary paging frequency access is used during the acquisition group 430. This reduces the complexity of the SCCS 5 but can also reduce the paging capacity.

After the acquisition group 430, the remaining paging information bursts 443 in the block 420, 421 each contain numeric or alpha-numeric pages, or a portion thereof. Except during the acquisition interval, paging information bursts 443 are transmitted only to the beams covering areas for which there is traffic. Every paging information burst 443 includes the optimum bit rate indicator 460 to indicate the optimum bit rate used for encoded bits of the words 450 forming the remainder of the simplex time slot 443, and further includes the frame ID, group ID, and block ID (as described above). This information aids the pager 2 in synchronizing to the down link protocol used in the SCCS 5.

During the message groups 433, the active frequency accesses are rotated through a transmit frame sequence that is fixed for the block 420, 421. The sequence of transmission frames is scheduled in accordance with the traffic demand.

The System Control Segment (SCS) (not shown) determines which beams served by a particular satellite are available to receive paging traffic during a superframe 410. The paging capacity in a beam at any time is allocated according to a demand projection based on previous paging history. Beams covering areas that are expected to receive a lot of paging traffic are scheduled for as many visits as resource and interference restrictions permit. These multiple transmit sequences are made at the expense of transmission opportunities into areas that are not expected to receive much traffic.

An indication of which frames 440 and frequency accesses will be used for visits to a particular area during a block 420, 421 is included in an activity table included in the acquisition group 430 for each frequency access. The activity table included in the acquisition group 430 can be different for each active frequency access. For example, the primary frequency access can be used to transmit in frames 1–48 and beams 1–48; while the secondary frequency access is used to transmit only in frames 1–10 in beams 10–20. However, the activity table for a frequency access is used by all four message groups 433 in a particular block 420, 421. Thus, there is no fixed relationship between the activity tables in these groups for the various frequency accesses.

During the acquisition group 430, alternate (i.e., secondary, tertiary and quaternary) frequency accesses follow transmission sequences with fixed time relationships to the primary frequency access sequence. The pagers 2 are preprogrammed with this timing, so that they can transfer to the alternate frequency access and synchronize with the correct sequence without waiting for the next acquisition group 430. At other times, the alternate frequency accesses visit beams as necessary to serve the traffic requirements in a manner similar to the primary frequency access.

Pager Operation Frequency Selection

The primary paging frequency access, along with the simplex time slot 443, defines the primary paging channel. On power up and on awaking from their sleep (inactive) periods, all pagers 2 first acquire the primary paging channel. The acquisition group 430 specifies which other paging frequency accesses are active in the message groups 433. After the acquisition group 430, predetermined groups of pagers 2 transfer to other active paging frequency accesses.

Timing and Synchronization

The battery life of a pager 2 is usually severely limited by practical battery constraints. Pagers can use a low duty sleep/wake cycle to extend this life. This cycle requires extended long sleep periods during which the pager 2 cannot receive signals from the satellites to maintain synchronization with the system. The synchronization problem is exacerbated by the limited stability of oscillators that can practically be implemented in a pager. Using inexpensive oscillators precludes maintaining all but the most rudimentary timing during the sleep period.

The high dynamics of a low-earth orbit system are not compatible with maintaining synchronization over large quiescent periods. The satellites move at a ground speed of about 6.5 kilometers per second. Thus, propagation delays and Doppler frequencies change drastically in a very short time. In addition, satellite hardware sharing considerations and limited available spectrum dictate that phase modulation similar to the modulation used for the duplex time slots 444 is used for the simplex time slots 443.

The SCCS 5 timing hierarchy and the associated pager operational cycle allows the pager 2 to employ a long sleep period of 172.3 seconds and still achieve the system synchronization necessary to receive paging messages during the block 421 in which it is awake, or active.

The pager 2 is only required to track the superframe timing during its sleep period. The pager 2 reacquires synchronization with the SCCS 5 at the beginning of each of its wake cycles. This is accomplished using the following operational sequence.

Search Mode

A pager 2 exits its sleep mode and enters a search mode either on power-up or when it has received no synchronization signal for a time period of length such that it can have lost its synchronization due to timing oscillator inaccuracy.

The pager 2 processes all simplex time slots 443 that it is capable of receiving and reads the burst type indicator 453. It realigns its internal timing according to the timing of the received bursts and the header information. If the burst type indicator 453 indicates that the group is neither the acquisition group 430 of the active block 421 for the pager 2 nor the fourth message group 433 of the block 420 preceding the active block 421, the pager 2 resets its sleep timer 48 (FIG. 3) based on the time difference between the time position of frame ID, group ID, and block ID of the acquired frame and the time position of the acquisition group 430 of its active block 421. The pager timer is set to activate the pager 2 in the fourth message group 433 of the block 420 preceding the pager's active block 421. The pager 2 then returns to the sleep mode.

If the frame ID, group ID, and block ID indicates that the group is either the acquisition group 430 of the active block 421 for the pager 2 or the fourth message group 433 of the block 420 preceding the active block 421, the pager 2 monitors all signals it can detect until it receives the acquisition group 430 from its active block 421. When the acquisition group indicates that the block 420, 421 is the pager's active block 421, the pager 2 continues to process all of the bursts it can acquire.

The pager 2 continues to process all bursts it can acquire over the forty-eight frame acquisition interval. The pager 2 stores the data from the acquisition group 430 of the three highest power bursts received from different beams. At the end of the acquisition group 430, the pager 2 generates a monitoring schedule for monitoring frames 440 within the message groups 433 by combining the information from the activity tables of the acquisition groups 430 received at the best signal-to-noise ratios. It will be apparent that the activity tables of more or fewer than three beams can be so combined.

Track Mode

At the end of the acquisition group 430, the pager 2 enters the track mode and remains in that mode through the remaining four message groups 433. In the track mode it monitors the frames 440 according to the monitoring schedule it determined from the activity tables received during the acquisition group 430.

In the track mode a pager 2 only turns on its receiver section 34 during the frames 440 in the monitoring schedule. When not receiving, the pager 2 enters a lower power quiescent mode. In a busy area it is possible, though highly unlikely, that all one hundred ninety frames in the message groups 433 of the block 421 will be included in the monitoring schedule.

The pager 2 corrects its internal timing based on received signal parameters throughout the acquisition and track modes.

After tracking through the active block 421, the pager 2 returns to the sleep mode. It remains in the sleep mode until its internal timer indicates that the acquisition group of its active block 421 in the next superframe 410 is imminent. It will be appreciated that when the pager 2 is operating in its normal tracking mode, it will activate at times during the block 421 which is associated with the pager 2, as determined by the activity tables within the block 421, but the pager 2 will not activate during the other blocks 420 with which it is not associated.

Bit Rate Optimization

Figure 8:
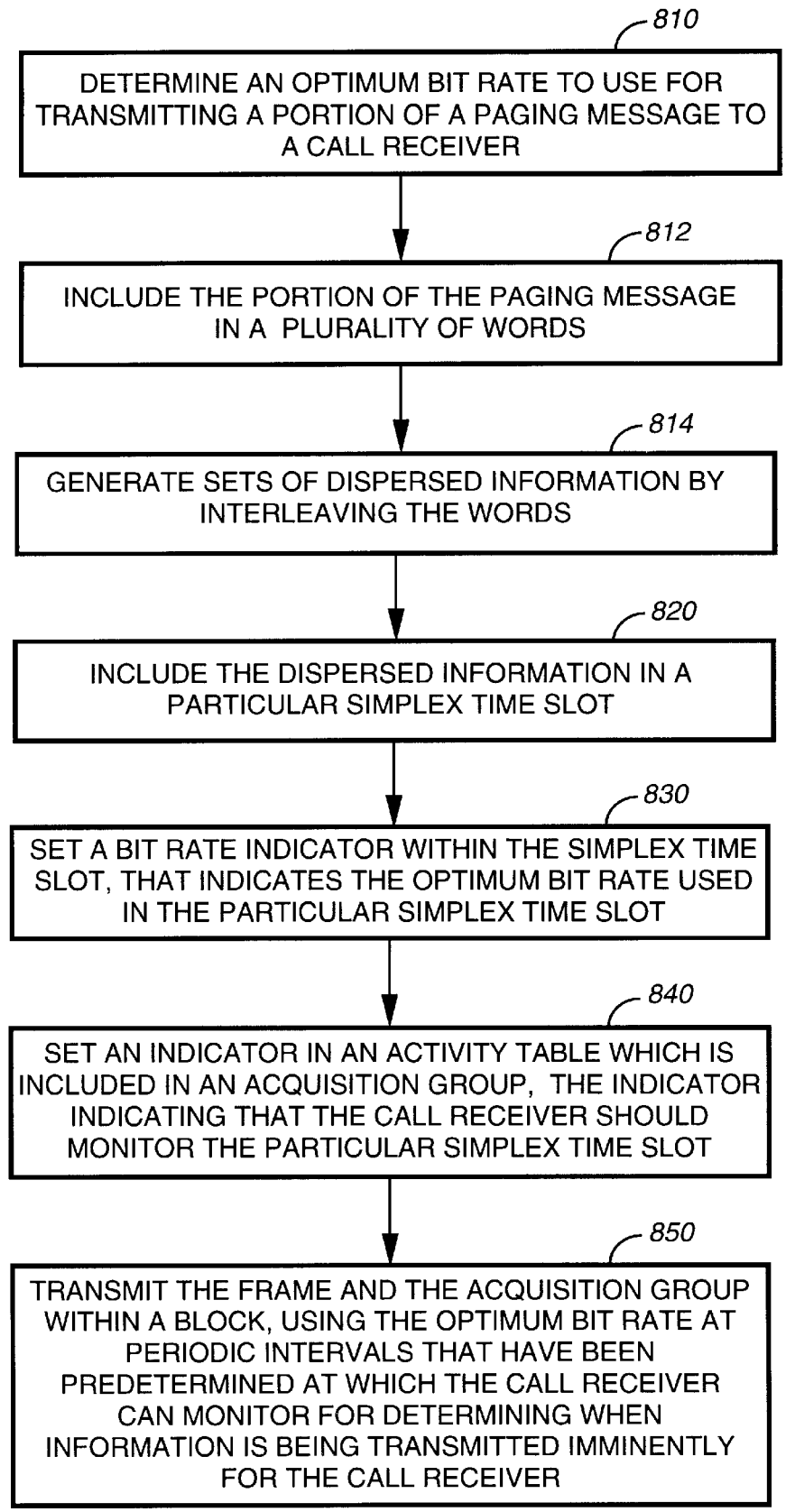
FIG. 8 shows a flow diagram of a method for generating a portion of a message intended for a pager in the satellite cellular communication system.

Referring to FIG. 8, a flow diagram of a method used in a satellite communication system for generating a hierarchical signalling protocol is shown, in accordance with the preferred embodiment of the present invention.

At step 810, an optimum bit rate and interleaving mode to use for transmitting a portion of a paging message to a call receiver is determined.

At step 812, the portion of the paging message is included in a set of information, which is a plurality of words 450, 455.

At step 814, sets of dispersed information are generated by interleaving the words.

At step 820, the sets of dispersed information are included in a particular simplex time slot 443.

At step 830, a bit rate indicator 460 is set within the particular simplex time slot 443, but not within the sets of dispersed information. The bit rate indicator 460 indicates the optimum bit rate and interleaving mode determined in step 810.

At step 840, an indicator is set in an activity table included in an acquisition group 430. The indicator indicates that the call receiver should monitor the particular simplex time slot 443, that is, go into the active power state during the particular simplex time slot 443.

At step 850, the particular simplex time slot 443 is transmitted within a block 421 using the optimum bit rate and interleaving mode to transmit the dispersed information. The acquisition group 430 is transmitted within the block 421. The block 421 is transmitted at periodic intervals that have been predetermined at which the call receiver can monitor for determining when information is being transmitted imminently for the call receiver.

Figure 9:
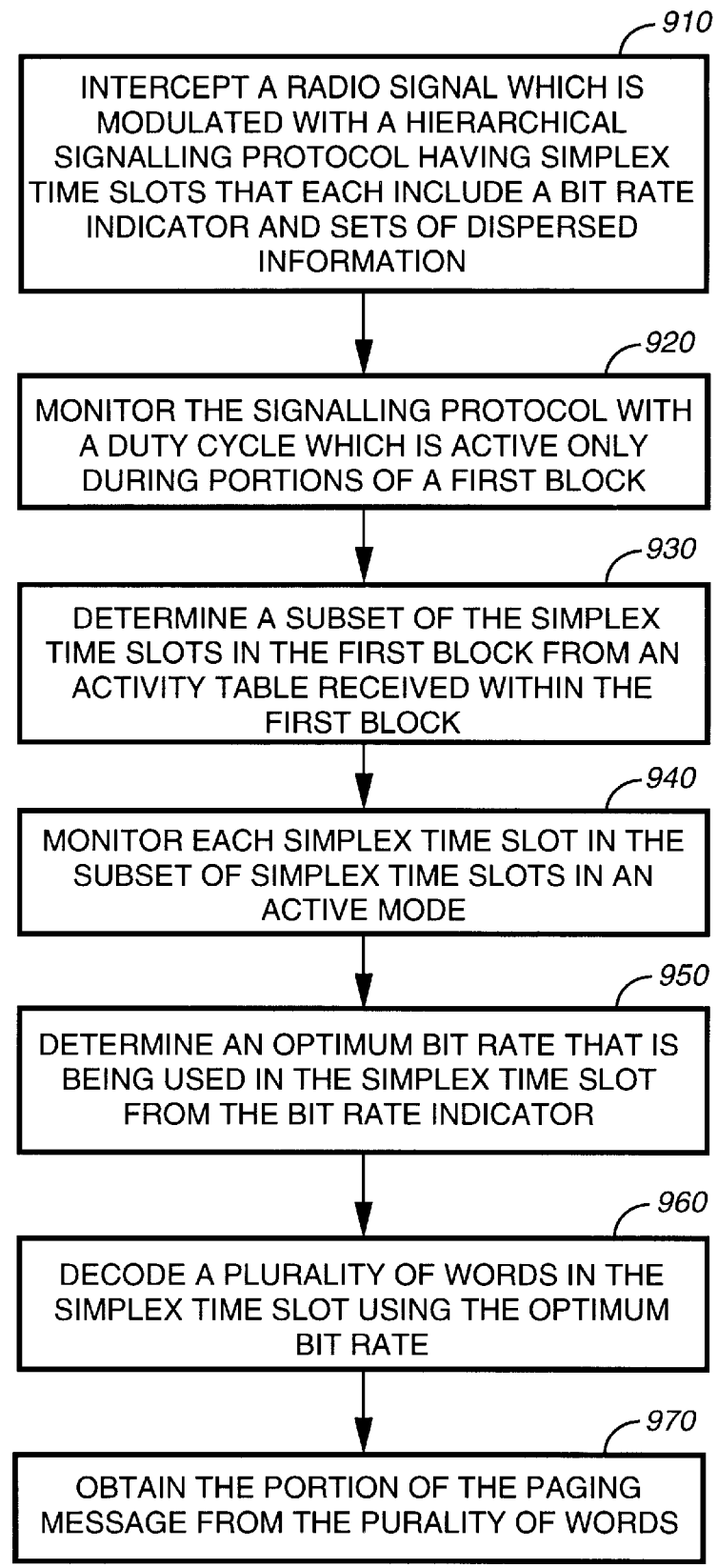
FIG. 9 shows a flow diagram of a method used in a pager for receiving a portion of a message transmitted using the hierarchical signalling protocol of the satellite cellular communication system, in accordance with the preferred embodiment of the present invention.

Referring to FIG. 9, a flow diagram of a method used in a pager for receiving a portion of a message transmitted using the hierarchical signalling protocol of the SCCS 5 is shown, in accordance with the preferred embodiment of the present invention.

At step 910, a radio signal is intercepted which is modulated with a hierarchical signalling protocol having simplex time slots 443 that each include a bit rate indicator 460 and sets of dispersed information that are interleaved words 450, 455.

The hierarchical signalling protocol further includes nine blocks, of which a first block is transmitted periodically and is associated with the call receiver. Each of the nine blocks comprises two hundred forty simplex time slots 453.

At step 920, the signalling protocol is monitored with an duty cycle which is active only during portions of the first block.

At step 930, a subset of the simplex time slots 453 in the first block is determined from at least one activity table received within the first block. The subset includes a particular simplex time slot 453 having the portion of the message.

At step 940, each simplex time slot 453 in the subset of simplex time slots 453 is monitored in an active mode.

At step 950, an optimum bit rate and interleaving mode that is being used in the particular simplex time slot 453 is determined from the bit rate indicator 460. The optimum bit rate is either 25,000 bits per second or 50,000 bits per second.

At step 960, a plurality of words 450, 455 are generated by decoding the sets of dispersed information using the optimum bit rate and interleaving mode.

At step 970, the portion of the paging message is obtained from the plurality of words 450, 455 decoded at step 960.

The signalling protocol described herein above with reference to FIGS. 6, 8, and 9 can be described as a hierarchical protocol having protocol divisions of levels identified as a variable bit rate protocol division which is the simplex time slot 443, and higher protocol divisions of the frame 440, the group 430, 433, the block 420, 421, up to a highest protocol division which is the superframe 410, wherein each protocol division comprises a plurality of protocol divisions of a next lower level which are normally transmitted periodically. In accordance with the preferred embodiment of the present invention, the variable bit rate protocol division comprises a plurality of sets of dispersed information in the form of interleaved words. In accordance with other embodiments, the variable bit rate protocol division comprises a single set of dispersed information (e.g., a convolution of the information bits). The variable bit rate protocol division cannot comprise less than one set of dispersed information.

It will be appreciated that the present invention provides benefits in comparison to prior art protocols wherein the optimum bit rate is indicated and used at higher protocol levels, such that the amount of information transmitted at one bit rate is very large. For example, in the FLEX™ protocol, the variable bit rate protocol division, which is a FLEX™ frame, includes 11,264 bits within the words in that protocol division at the highest bit rate, while in the protocol in accordance with the preferred embodiment of the present invention, there are 832 bits within the words in the simplex time slot (the variable bit rate protocol division) at the highest bit rate. Having fewer bits in the variable bit rate protocol division provides better efficiency of information throughput by optimizing the protocol division at which the optimum bit rate is determined, so that fewer retransmissions are required while still using a higher bit rate when possible, as long as the number of bits does not become so small (for instance, 64 bits) so as to degrade the usefulness of changing the bit rate. In accordance with the preferred embodiment of the present invention, the optimum protocol division for the bit rate indicator 460 is the simplex time slot 443. It will be further appreciated that the variable bit rate protocol division in accordance with the preferred embodiment of the present invention is at a protocol division different from and lower than the protocol division at which battery saving is performed. This is a consequence of the fact that pages within a battery interval may be transmitted to different pagers using links having different characteristics.

It will be appreciated that the method of obtaining and using an optimum bit rate for decoding paging messages described with reference to FIG. 9 is advantageously usable by pagers or by two way radios when receiving messages in communication systems using other types of hierarchical signalling protocols which have lowest protocol divisions comprising a different number of interleaved words or other sets of dispersed information, and comprising other higher protocol divisions than described herein with reference to the preferred embodiment of the present invention. The method when used in other communication systems is stated more generally as follows:

In a first step, a radio signal is intercepted which is modulated with a hierarchical signalling protocol having variable bit rate protocol divisions that each include a bit rate indicator and a set of encoded information. A particular variable bit rate protocol division includes the portion of the paging message.

In a second step, an optimum bit rate that is being used in the particular variable bit rate protocol division is determined from the bit rate indicator included therewith.

In a third step, a set of information is generated by decoding the set of encoded information in the particular variable bit rate protocol division, using the optimum bit rate.

In a fourth step, the portion of the paging message is obtained from the set of information.

The hierarchical signalling protocol further includes a predetermined plurality of battery saving protocol divisions, of which a first battery saving protocol division is transmitted periodically and is associated with the call receiver. Each of the battery saving protocol divisions comprises a predetermined plurality of the variable bit rate protocol divisions.

In a fifth step, the signalling protocol is monitored with an duty cycle which is only active during portions of the first battery saving interval.

In a sixth step, a subset of the predetermined plurality of variable bit rate protocol divisions is determined from at least one activity table received within the first battery saving protocol division. The subset includes the particular variable bit rate protocol division.

In a seventh step, each variable bit rate protocol division in the subset of the predetermined plurality of variable bit rate protocol divisions is monitored in an active mode.

It will be appreciated that each of the steps described above and with reference to FIGS. 8 and 9 is accomplished by the pager 2, or call receiver, under the control of the processor 39, which is operated under the control of the programs stored in memory 40 and in the demodulator 37. Each step described above with reference to FIGS. 8 and 9 is accomplished by a segment of the programs.

By now it should be appreciated that there has been provided a method for generating and receiving a hierarchical signalling protocol in a communication system, in which the signalling protocol advantageously allows the use of an optimum bit rate at a variable bit rate protocol division which is a lower protocol division of the signalling system protocol than the protocol division at which battery saving is performed in pagers that are used in satellite cellular and other communication systems, thereby reliably increasing the data throughput of such systems in comparison to other prior art systems.

We claim:

1. A method for receiving a portion of a message by a call receiver, comprising the steps of:

intercepting radio signal which is modulated with a hierarchical signalling protocol having variable bit rate protocol divisions that each include a bit rate indicator and encoded information wherein the encoded information comprises information bits in a plurality of words that are interleaved with each other;

determining a bit rate and an associated interleaving mode the determination made from the bit rate indicator included in a particular variable bit rate protocol division generating a set of information by decoding the encoded information included in the particular variable bit rate protocol division using the optimum bit rate and the associated interleaving mode; and obtaining from the set of information the portion of the message, wherein the bit rate and associated interleaving mode are either a first bit rate 25,000 bps and an associated interleaving using 13 sequential pairs of 26 thirty two bit words or a second bit rate of 50,000 bps and an associated interleaving using a sequential triplet of thirty two bit words plus 5 sequential pairs of thirty two bit words.

2. The method according to claim 1, wherein each of the variable bit rate protocol divisions includes only one set of dispersed information.

3. The method according to claim 1, wherein the radio signal is transmitted by a satellite communication system, and wherein each of the variable bit rate protocol divisions, including the particular variable bit rate protocol division, is a simplex time slot.

4. A method for generating hierarchical signalling protocol for use in a sattelite communication system comprising the steps of:

determining an optimum bit rate having an associated interleaving mode to use for transmitting a portion of a paging message to call receiver;

including the portion of the paging message in a set of information;

generating a set of encoded information by using the associated interleaving mode:

including the set of encoded information in a particular variable bit rate protocol division;

setting a bit rate indicator within the particular variable bit rate protocol division, but not within the set of encoded information, wherein the bit rate indicator indicates the optimum bit rate and the associated interleaving mode;

setting an indicator in an activity table included in a battery saving protocol division to indicate that the caller receiver should monitor the parlicular variable bit rate protocol division; and transmitting the particular variable bit rate protocol divisions using the optimum bit rate to transmit the set of encoded information and transmitting the battery saving protocol division, wherein the battery saving protocol division is transmitted at periodic intervals that have been predetermined at which the call receiver can monitor for determining when information is being transmitted imminently for the call receiver, wherein the optimum bit rate and associated interleaving mode are either a first bit rate 25,000 bps and an associated interleaaving using 13 sequential pairs of 26 thirty two bit words or a second bit rate of 50,000 bps and an associated interleaving using a sequential triplet of thirty two bit words plus 5 sequential pairs of thirty two bit words.

5. A call receiver comprising:

a receiver section for intercepting a radio signal which is modulated with a hierarchical signalling protocol having variable bit rate protocol divisions that each include a bit rate indicator and encoded information, wherein a particular variable bit rate protocol division includes a portion of a message:

a processor, coupled to said receiver section, which controls the call receiver; and a memory, coupled to said processor, for storing computer programs which control the processor, comprising a first segment for determining from the bit rate indicator a bit rate having an associated interleaving mode that is being used in the particular variable bit rate protocol division;

a second segment for generating a set of information by decoding encoded infomation in the particular variable bit rate protocol divisions using the bit rate and the associated interleaving mode; and a third segment for obtaining from the set of information the portion of the message, wherin the bit rate and associated interleaving mode are either a first bit rate 25,000 bps and an associated interleaving using 13 sequential pairs of 26 thirty two bit words or a second bit rate of 50,000 bps and an associated interleaving using a sequential triplet of thirty two bit words plus 5 sequential pairs of thirty two bit words.

* * * * *